(12) United States Patent
Bulut et al.

(10) Patent No.: US 10,601,857 B2
(45) Date of Patent: Mar. 24, 2020

(54) AUTOMATICALLY ASSESSING A SEVERITY OF A VULNERABILITY VIA SOCIAL MEDIA

(71) Applicant: INTERNATIONAL BUSINESS MACHINES CORPORATION, Armonk, NY (US)

(72) Inventors: Muhammed Fatih Bulut, New York, NY (US); Lisa Chavez, Placitas, NM (US); Jinho Hwang, Ossining, NY (US); Virginia Mayo, Piscataway, NJ (US); Maja Vukovic, New York, NY (US); Sai Zeng, Yorktown Heights, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 111 days.

(21) Appl. No.: 15/825,086

(22) Filed: Nov. 28, 2017

(65) Prior Publication Data

US 2019/0166150 A1 May 30, 2019

(51) Int. Cl.
| | |
|---|---|
| H04L 29/06 | (2006.01) |
| G06Q 50/00 | (2012.01) |
| H04L 12/58 | (2006.01) |

(52) U.S. Cl.
CPC ......... H04L 63/1433 (2013.01); G06Q 50/01 (2013.01); H04L 51/32 (2013.01); H04L 63/1441 (2013.01)

(58) Field of Classification Search
CPC .. H04L 63/1433; H04L 63/1441; H04L 51/32
See application file for complete search history.

(56) References Cited

U.S. PATENT DOCUMENTS

| | | |
|---|---|---|
| 7,334,222 B2 | 2/2008 | Keller |
| 7,664,845 B2 | 2/2010 | Kurtz et al. |
| 8,407,791 B2 | 3/2013 | Granstedt et al. |
| 8,533,843 B2 | 9/2013 | Levi |

(Continued)

OTHER PUBLICATIONS

Cisar et al, "Scoring System as a Method of Improving IT Vulnerability Status," Annals of Faculty Engineering Hunedoara—International Journal of Engineering Tome XIV [2016]—Fascicule 3 [August], 12 pages.

(Continued)

*Primary Examiner* — Teshome Hailu
(74) *Attorney, Agent, or Firm* — Intelletek Law Group, PLLC; Gabriel Daniel, Esq.

(57) ABSTRACT

A method and system of identifying technical experts for an identified vulnerability is provided. One or more technical experts for each of one or more categories of the vulnerability are identified. Questions are sent to and answers are received from the one or more identified technical experts for each of the one or more categories of vulnerabilities, via a chatbot module. Answers to parameters that are missing for a Common Vulnerability Scoring System (CVSS) for the identified vulnerability are determined from the received answers to the parameters. The answers to the parameters are validated and a CVSS score is calculated based on the validated determined answers.

20 Claims, 10 Drawing Sheets

(56) References Cited

U.S. PATENT DOCUMENTS

| | | | |
|---|---|---|---|
| 8,763,127 B2* | 6/2014 | Yao | G06F 21/316 |
| | | | 726/24 |
| 9,003,537 B2 | 4/2015 | Raz et al. | |
| 9,672,255 B2 | 6/2017 | Lange et al. | |
| 9,692,778 B1 | 6/2017 | Mohanty | |
| 9,715,493 B2 | 7/2017 | Papadopoullos et al. | |
| 9,846,780 B2 | 12/2017 | Tonn et al. | |
| 2009/0099885 A1 | 4/2009 | Sung et al. | |
| 2010/0153156 A1 | 6/2010 | Guinta et al. | |
| 2011/0320816 A1* | 12/2011 | Yao | G06F 21/316 |
| | | | 713/171 |
| 2013/0151531 A1 | 6/2013 | Li et al. | |
| 2014/0195625 A1 | 7/2014 | Weldon | |
| 2015/0120717 A1 | 4/2015 | Kim et al. | |
| 2015/0242515 A1 | 8/2015 | Trabelsi et al. | |
| 2016/0277432 A1 | 9/2016 | Lahiri et al. | |
| 2016/0359895 A1 | 12/2016 | Chiu et al. | |
| 2017/0034023 A1 | 2/2017 | Nickolov et al. | |
| 2017/0171231 A1* | 6/2017 | Reybok, Jr. | H04L 63/14 |
| 2018/0027013 A1* | 1/2018 | Wright | H04L 63/1483 |
| | | | 726/23 |
| 2018/0293389 A1 | 10/2018 | Mahaffey et al. | |
| 2019/0036864 A1* | 1/2019 | Reuss | H04L 51/32 |
| 2019/0104157 A1* | 4/2019 | Filar | H04L 63/20 |

OTHER PUBLICATIONS

Singh et al., "Quantitative Security Risk Evaluation using CVSS Metrics by Estimation of Frequency and Maturity of Exploit," Proceedings of the World Congress on Engineering and Computer Science 2016, vol. I, WCECS 2016, Oct. 19-21, 2016, San Francisco, USA, 6 pages.

Luo et al, "A Software Vulnerability Rating Approach Based on the Vulnerability Database," Journal of Applied Mathematics, vol. 2014, Article ID 932397, 9 pages.

Chatzipoulidis, "Enterprise Management and Software Risk Prediction Based on Security Metrics," University of Macedonia, Department of Applied Informatics, Jun. 2015, 163 pages.

Mell et al, "The NIST Definition of Cloud Computing," Recommendations of the National Institute of Standards and Technology, Special Publication 800-145, Sep. 2011, pp. 1-3.

National Vulnerability Database—available at https://nvd.nist.gov/vuln-metrics/cvss/v3-calculator?name=CVE-2016- 0051.

* cited by examiner

AUTOMATICALLY ASSESSING A SEVERITY OF A VULNERABILITY VIA SOCIAL MEDIA

BACKGROUND

Technical Field

The present disclosure generally relates to computer security, and in particular, to assessing a severity of a vulnerability of computing devices by electronic analysis of social media.

Description of the Related Art

Today, being aware of the network risk that computing devices are exposed to, is an important consideration for business enterprises. By knowing the severity of the vulnerabilities that exist, business enterprises can implement a vulnerability management strategy to mitigate the risk. To that end, risk estimation scores are provided by various security organizations, such as the National Institute of Standards and Technology (NIST), National Vulnerability Database (NVD), the Common Vulnerability Scoring System (CVSS), etc.

The CVSS is an open industry standard for determining the severity of computer system security vulnerabilities. To that end, CVSS assigns a severity score to each known vulnerably, thereby allowing business enterprises to prioritize resources commensurate to perceived threat. Scores are typically calculated based on a formula that depends on several metrics that approximate ease of exploit and the impact of exploit. For example, scores range from 0 to 10, with 10 being the most severe. In addition to the CVSS base score for determining the severity of a vulnerability, temporal and environmental scores can also be considered to determine the availability of mitigations and how widespread the vulnerability is within a business enterprise.

SUMMARY

According to various embodiments, a computing device, a non-transitory computer readable storage medium, and a method are provided of determining a common vulnerability scoring system (CVSS) score for an identified vulnerability related to a computing device. One or more technical experts for each of one or more categories of vulnerabilities (of the identified vulnerability) are identified. Questions are sent to and answers received from one or more identified technical experts in each of the one or more categories of vulnerabilities, via a chatbot module. Answers to parameters that are missing for the CVSS for the identified vulnerability are determined from the received answers to the parameters. The answers to the parameters are validated and a CVSS score is calculated based on the validated determined answers In one embodiment, identifying one or more technical experts for the one or more predetermined categories of vulnerabilities includes receiving social media communication from a social media repository. For each contributor of the social media communication that is related to a vulnerability, one or more expertise parameters including at least one of: (i) a peer vote; (ii) a number of views; (iii) a number of comments; and (iv) a number of retweets, are evaluated. One or more categories of vulnerabilities of expertise of the contributor are determined. For each category of vulnerability of expertise of the contributor, an expertise score is assigned to the contributor, based on the expertise parameters. Upon determining that the contributor has an expertise score that is above a predetermined threshold for the category of vulnerability, the contributor is classified as a technical expert for the category of vulnerability. A profile of the technical expert, including the expertise score for the category of vulnerability, is then stored in a profile database.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

Figure 1:
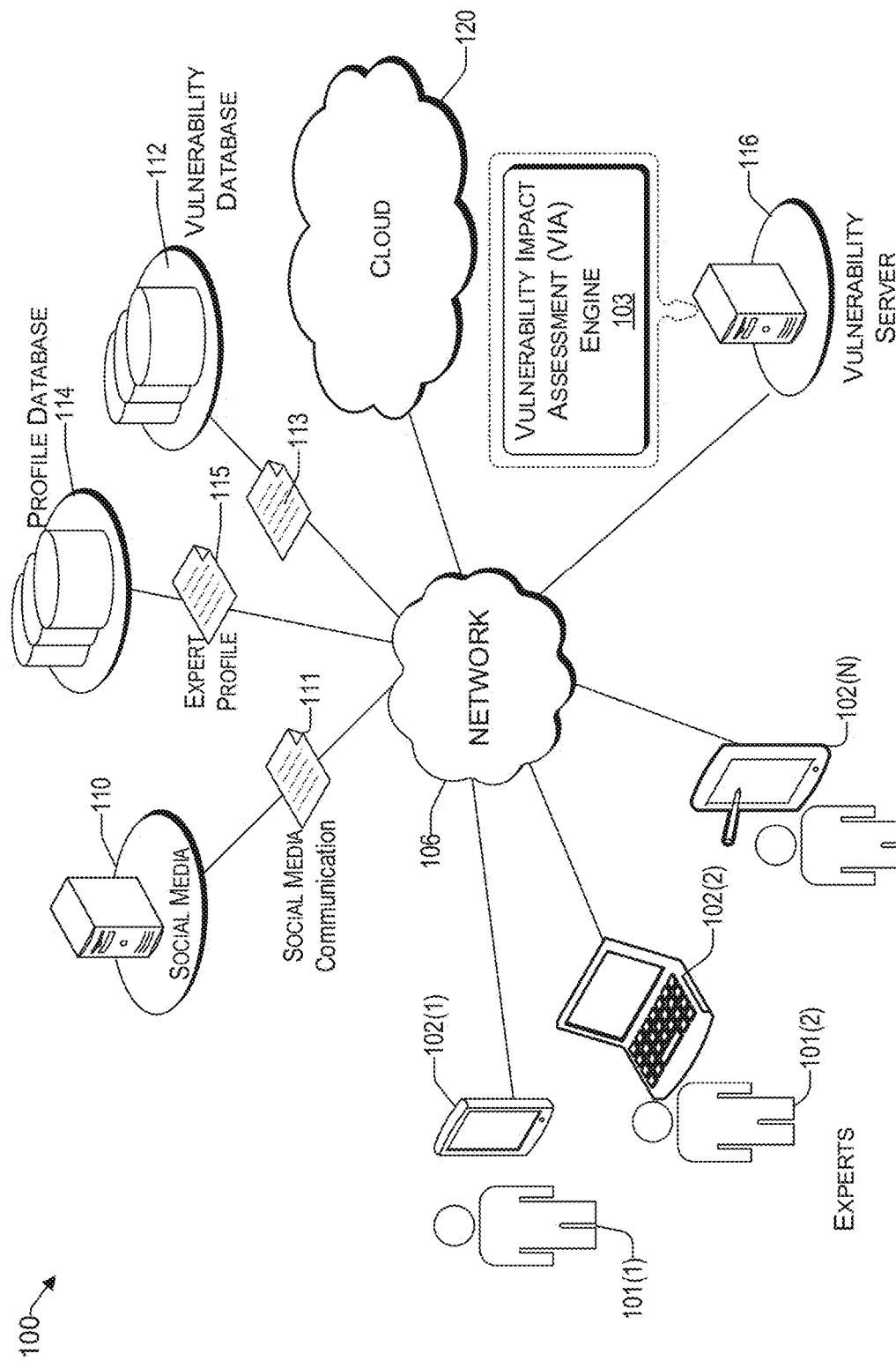
FIG. 1 illustrates an example architecture for determining a severity of a vulnerability related to computing devices, via social media.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

In one aspect, the present disclosure relates to systems and methods of determining a severity of an identified vulnerability. By knowing the severity of the vulnerabilities that exist, business enterprises can implement a vulnerability management strategy to mitigate the risk. Vulnerability management should be proactive to ensure that vulnerabilities are assessed, prioritized, and remediated before they can damage part of a computing infrastructure. One way of rating an identified vulnerability is via the Common Vulnerability Scoring System (CVSS). By virtue of using a rating system, it allows a business enterprise to rate, compare, and take appropriate action.

Today, calculation of the CVSS score includes intrinsic characteristics of vulnerability (Base vector), its evolution over time (Temporal vector) and security level of a business enterprise (Environmental vector). Each vector may include metrics that are evaluated to compute a corresponding CVSS score. Typically, Base metrics are included in the CVSS score while Temporal and Environmental metrics may be considered for better resolution. This CVSS score allows business enterprises to provide an effective vulnerability management strategy. For example, if a risk is high, as indicated by a high CVSS score value, it may involve more computing resources in defense of the vulnerability, it may impact release of a new product line, etc. However, when a severity of the vulnerability is low, a business enterprise can allocate fewer computing and/or technical resources to prevent the vulnerability from affecting their business enterprise, and possibly release their products into the market earlier. Thus, an early and accurate assessment would not only provide business enterprises a competitive advantage, but would reduce valuable computing resources to mitigate the vulnerability.

While the CVSS score is a salient tool in the vulnerability management strategy, vulnerabilities and/or various aspects of the vulnerability may not be known early enough for security services to provide an accurate CVSS score. For example, if salient parameters of an identified vulnerability are not known, a vendor who provides a CVSS score may default to a high vulnerability score, until more information is learned about the vulnerability. Such approach does not provide meaningful information to leverage a vulnerability management strategy, which ultimately may lead to a waste of computing resources until a more accurate CVSS score is available.

Accordingly, instead of waiting for an official CVSS score, in one aspect, what is provided herein is a method and system of identifying a severity of an identified vulnerability, via social media. Social media includes, without limitation, computer help forums, hacker blogs and forums, chat rooms, and social media streams, such as Twitter, Pinterest, Facebook, Instagram, etc. Victims experiencing a security threat, security vendors, system administrators, and hackers (sometimes referred to herein as malicious parties), who discuss vulnerabilities on social media sites (e.g., Twitter), provide a rich source of information. Indeed, malicious parties often discuss technical details about exploits and the victims of attacks share their experiences. Also, in some scenarios, vulnerabilities that can be identified via social media communication would not be identified or reported early enough to system administrators. Even though such social media feeds can be inaccurate and replete with misinformation, applicants have identified efficient ways of mining and aggregating the social media feeds to electronically analyze the data therein to identify sources that could facilitate the determination of the CVSS score.

Accordingly, what is provided herein is a method and system for early identification of a CVSS score for a computing device vulnerability. A vulnerability related to a computing device is identified and related to one or more vulnerability categories. Social media is used to identify one or more technical experts for each of the one or more vulnerability categories. A chatbot communicates with the one or more identified technical experts in each of the one or more categories to determine parameters that are missing for the CVSS. An early CVSS score is provided based on the validated parameters. By virtue of the concepts discussed herein, an early detection of a CVSS score of an identified vulnerability is provided. Reference now is made in detail to the examples illustrated in the accompanying drawings and discussed below.

Example Architecture

FIG. 1 illustrates an example architecture 100 for determining a severity of a vulnerability related to computing devices, via social media. Architecture 100 may include one or more computing devices 102(1) to 102(N) that are operated by experts 101(1) to 101(N), respectively, one or more social media servers 110, a vulnerability database 112, a profile database 114, a vulnerability server 116 having a vulnerability impact assessment engine (VSAE) 103, and a cloud 120. As used herein, an "expert" is a user of the network 106 and a participant of social media communication, who is knowledgeable regarding parameters of one or more vulnerabilities in one or more vulnerability categories.

The network 106 allows various experts 101(1) to 101(N) to communicate with each other, other users of the network 106, and various resources that are connected to the network 106, such as one or more social media servers 110, a vulnerability database 112, vulnerability server 116, and the cloud 120, via their computing devices 102(1) to 102(N), respectively. The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet, that provides various ancillary services, such as communication with various application stores, libraries, the Internet, and the cloud 120. A computing device (e.g., 102(1) to 102(N)), among other functions, allows a user to communicate with other users directly (e.g., via e-mail, text, telephone, etc.,) or via social media 110. A computing device (e.g., 102(1) to 102(N)) can also be used to receive questions, notifications, and/or updates from the vulnerability server 116. Users of the computing devices discussed herein may include technical experts, malicious parties, victims of the malicious parties, and regular users. Regular users may include users who have not have been directly affected by a vulnerability and/or who can participate in social media to discuss vulnerabilities.

For purposes of later discussion, several computing devices appear in the drawing, to represent some examples of the devices that may receive various resources via the network 106. Today, computing devices typically take the form of portable handsets, smart-phones, tablet computers, laptops, desktops, personal digital assistants (PDAs), and smart watches, although they may be implemented in other form factors, including consumer, and business electronic devices.

Social media includes, without limitation, computer help forums, hacker blogs and forums, chat rooms and social media streams, such as Twitter, Pinterest, Facebook, Instagram, and the like, collectively represented herein by way of a social media server 110, which is configured to facilitate communication between subscribers via their computing devices 102(1) to 102(N). The social media 110 is a source of social media communication 111 for the vulnerability server 116, as well as dependable threads 111, discussed in more detail later.

Architecture 100 may include a vulnerability database 112 configured to store and maintain an up-to-date list of computing device and/or network security concerns, referred to herein as vulnerabilities. For example, the vulnerability database 112 may be maintained by a security software company or a consortium of organizations and/or individuals interested in network security, such as the National Vulnerability Database (NVD), US-CERT Vulnerability Notes Database, Open Sourced Vulnerability Database (OSVDB), X-FORCE by IBM, and the like. The vulnerability database 112 provides data 113 that includes network security information in the form of data packets to the VSAE 103 of the vulnerability server 116, at predetermined intervals or upon a trigger event. In one embodiment, the security information 113 may include identified vulnerabilities with their corresponding CVSS score. These CVSS scores may be of different quality in that they can be calculated by various available metrics (to provide an accurate score), or may provide a default high score when one or more parameters are not available, which is cured by the teachings herein.

The security information 113 from the vulnerability database 112 can be used by the VSAE 103 to identify signatures of active and potential vulnerabilities that may be affecting the network 106 or the computing devices 102(1) to 102(N) coupled thereto. In some embodiments, the signature may include key terms that are consistent with a vulnerability.

In one embodiment, machine learning may be used by the VSAE 103 to learn from the security information (sometimes referred to herein as historic data or example data) 113, received from the vulnerability database 112 during a training phase. Machine learning is a subfield of computer science that evolved from the study of pattern recognition and computational learning theory in artificial intelligence. Machine learning is used herein to construct algorithms that can learn from and make predictions based on the data stored in the vulnerability database 112. Such algorithms operate by building a model from stored prior inputs or baselines therefrom to make data-driven predictions or decisions (OR to provide threshold conditions to indicate a vulnerability), rather than following strictly static criteria.

Based on the machine learning, patterns, trends, and key words that are consistent with a vulnerability are identified from the social media communication 111. In various embodiments, the machine learning discussed herein may be supervised or unsupervised. In supervised learning, the VSAE 103 may be presented with example data 113 from the vulnerability database 112 as being acceptable. Put differently, the vulnerability database 112 acts as a teacher for the VSAE 103. In unsupervised learning, the vulnerability database 112 does not provide any labels as what is acceptable, rather, it simply provides historic data (e.g., 113) to the VSAE 103 that can be used together with the recently harvested social media communication 111 from the system to find its own structure among the data. In various embodiments, the machine learning may make use of techniques such as supervised learning, unsupervised learning, semi-supervised learning, deep learning, naïve Bayes, Bayesian networks, decision trees, neural networks, fuzzy logic models, and/or probabilistic classification models.

The architecture 100 includes a VSAE 103, which is a software program that runs on the vulnerability server 116. In various embodiments, in a training phase, the VSAE 103 is configured to develop models via machine learning, based on the security information 113 it receives from the vulnerability database 112, to identify at least one of (i) vulnerabilities in social media communication 111 that it receives and (ii) identify experts in different vulnerability categories. The identified experts can then be stored in a profile database 114. The technical expert profiles 115 can then be retrieved from the profile database 114 during a later interaction or resolution phase, discussed in more detail later.

In various embodiments, the social media communication 111 may be received continuously in real time, at predetermined intervals (e.g., every 10 minutes, every day, etc.,) or upon a trigger event (e.g., upon the vulnerability database 112 indicating that there is an increased network security concern or when an updated list of technical experts for a vulnerability category is desired by the VSAE 103).

In one embodiment, the VSAE 103 may discard social media that is deemed to be SPAM. For example, tweets that are intended for marketing may be removed from the social media communication packet 115 by the VSAE 103, thereby reducing the volume of data to be processed. In various embodiments, keywords, machine learning, or a combination thereof may be used to discern the intent of each social media communication in the social media communication 111.

For example, natural learning processing (NLP) can be used to process the raw natural language content of each communication in the social media communication 111 from experts 101(1) to 101(N). This natural language content may be received in the form of text or voice. Regarding the latter, the VSAE 103 can perform speech recognition to determine the textual representation thereof. In natural speech, there may not be discernable pauses between successive words. To that end, speech segmentation may be performed to separate the words into meaningful sentences.

In one embodiment, concept expansion, such as the IBM Watson concept expansion, can be used to identify the concept cues in each communication to determine the intent thereof. In this regard, large sets of unstructured sets of data may be provided to the VSAE 103 during a training phase, such that it can learn therefrom. The large sets of unstructured data may relate to prior communication that is deemed to be SPAM (e.g., by a SPAM filter repository—not shown), which now acts as a corpus of data to learn from. In various embodiments, this corpus of data may be received from the vulnerability database 112 or from another suitable source, such as a repository for SPAM (not shown in FIG. 1).

Such concept expansion enables the creation of a specialized dictionary for the cognitive application of identifying the subject matter and scope of the communication, collectively referred to herein as the "intent" of the social media communication (e.g., tweet) during an interaction or resolution phase. Concept expansion enables the VSAE 103 to build a specialized dictionary for the cognitive application of interacting with the social media communication 111 that may be stored in a memory of the vulnerability server 116 (or any other suitable repository, such as the cloud 120). Thus, unstructured source text that may not include well-formed language, such as email, text messages, and text that has been extracted via speech recognition, can be analyzed to discern its intent. Accordingly, the VSAE 103 can correctly understand industry specific terminology, local euphemisms, and colloquial terms that may be encountered in social media. In this way, social media communication that is deemed to be SPAM (e.g., has a marketing effect) can be filtered out. Similarly, concept expansion can be used to better understand the content of the social media communication between an identified expert and a chatbot of the VSAE 103, discussed in more detail later.

Figure 2:
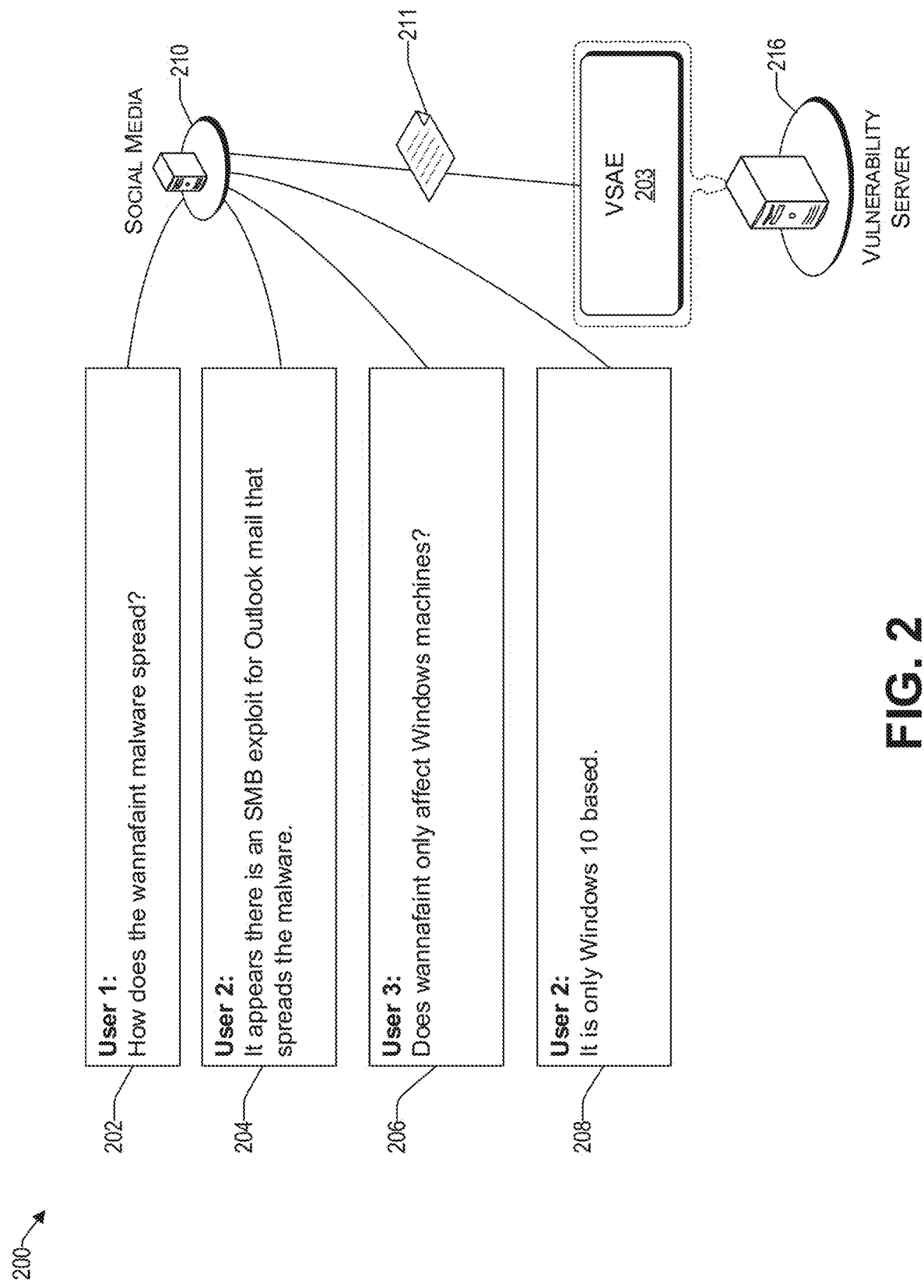
FIG. 2 illustrates a conceptual diagram of a social media communication that is related to a vulnerability.

As mentioned above, the operation of the VSAE 103 can be divided into (i) a training phase, (ii) an interaction phase, and (iii) a resolution phase. In one embodiment, there is an additional monitoring phase, discussed in more detail later. During a training phase, the VSAE 103 is configured to (i) identify experts for each category of a vulnerability, and (ii) create models from training data, which can later be used to identify technical experts (i.e., during an interaction phase). During an interaction phase, in one aspect, the VSAE 103 is configured to determine whether a communication or a communication thread of the social media communication 111 is related to a vulnerability, by way of the machine learning that may have been performed earlier (i.e., training phase), as discussed above. In this regard, reference is made to FIG. 2, which illustrates a conceptual diagram of a social media communication thread 200 that is related to a vulnerability. By way of example, and not by way of limitation, the communication 200 is illustrated as a thread of tweets 202 to 208 between several participants. The vulnerability engine 203 running on the vulnerability server 216 is able to determine (i) that each post of the communication 200 is not related to SPAM, (ii) that the communication 200 is related to a vulnerability, (iii) the category of the vulnerability (discussed in more detail below), and (iv) that user 2 may be a technical expert.

In various embodiments, the vulnerability may be provided by the vulnerability database 112 or automatically determined by the VSAE 103 via social media 110. Accordingly, upon identifying a vulnerability (either automatically or via receipt from the vulnerability database 112), the VSAE 103 is configured to classify the vulnerability into a predetermined category. The categories may include, without limitation, Denial of Service (DOS), SQL Injection, code execution, memory corruption, etc., Upon identifying a vulnerability and the one or more categories thereof, the VSAE 103 identifies one or more technical experts for the one or more categories of the vulnerability, discussed in more detail later. In case of automatically identifying a vulnerability by the VSAE 103 (instead of receiving the name and relevant parameters of the vulnerability from the vulnerability database), in one embodiment, the VSAE 103 may determine whether additional criteria are met, before identifying the one or more technical experts. For example, the VSAE 103 may determine whether a number of vulnerabilities is above a predetermined threshold for an identified vulnerability in a category for a time period. If so, the VSAE 103 can then proceed to identifying one or more technical experts for the one or more categories of the vulnerability. In various embodiments, the predetermined threshold may be different for each category, based on the potential harm that it can cause.

In an interaction phase, upon identifying the one or more technical experts for the one or more categories of the identified vulnerability, the VSAE 103 is configured to interact with the one or more technical experts (or a filtered list of the one or more technical experts) via a chatbot module of the VSAE 103 to determine missing parameters for the CVSS. In various embodiments, the parameters may be based on at least one of the three metric groups, namely (i) Base, (ii) Temporal, and (iii) Environmental, each including a set of metrics. The base metric group represents the intrinsic characteristics of a vulnerability. The characteristics of the base metric group are constant over time and across user environments. The base metric group includes two sets of metrics, namely the exploitability metrics and the impact metrics. For example, the exploitability metrics are based on the ease by which a vulnerability can be exploited. As to the impact metrics, they represent the consequence of a successful exploit. In various scenarios, the impacted entity could be a hardware device, a software application, or a network component.

The temporal metric group is based on the characteristics of a vulnerability that may change over time but not across user environments. For example, the presence of a readily available exploit would increase the CVSS score, while the creation of an official patch (e.g., provided by the vulnerability database 112) would decrease the score.

Figure 3:
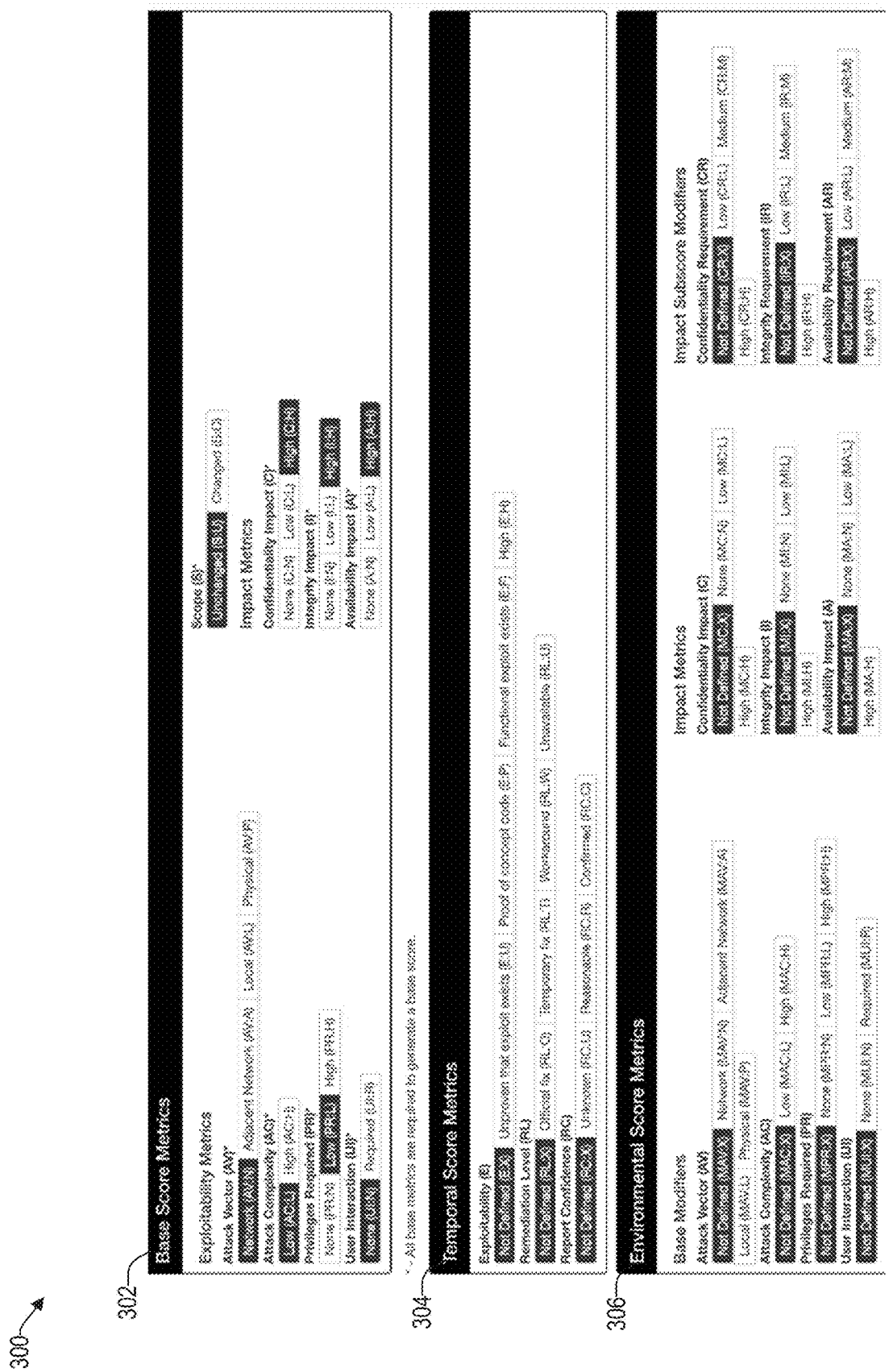
FIG. 3 illustrates an example table that includes various salient Common Vulnerability Scoring System parameters that may be used to define a score.

The environmental metric group represents the characteristics of a vulnerability that are salient to a particular user's environment. In various embodiments, the impact metrics of the base metric group may be used alone or in combination with the exploitability metrics of the base metric group to provide a CVSS score. In other embodiments, the temporal and environmental metrics are included as well for a more comprehensive CVSS score. To that end, FIG. 3 illustrates an example table that includes various salient CVSS parameters that may be used to define a CVSS score. By way of example only, and not by way of limitation, the example of FIG. 3 is one provided by the national vulnerability database. The table may be provided by the vulnerability database 112 or created by the VSAE 103. For example, the table 300 may include both available and missing parameters for the base score 302, temporal score 304, and the environmental score. Parameters that are not defined (e.g., known) may be used as a basis for questions by the chatbot module of the VSAE 103.

Figure 4:
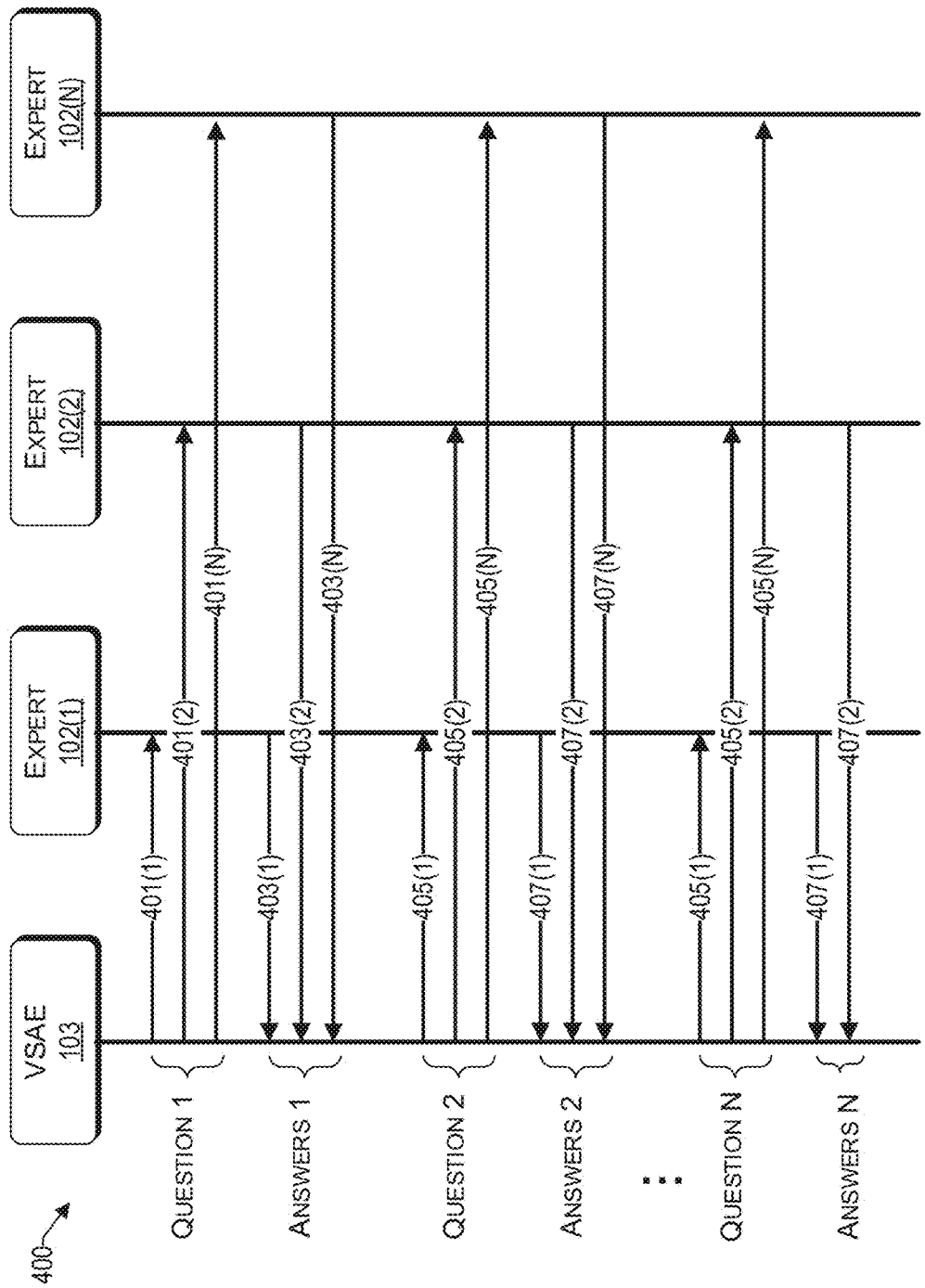
FIG. 4 illustrates an example call flow between a chatbot module technical experts.

Accordingly, the chatbot module of the VSAE 103 interacts with the one or more identified experts in the particular category of the identified vulnerability to extract the missing parameters of the CVSS, such that an early score can be obtained, that is independent from a later official score that may be provided by the vulnerability database 112. In this regard, reference is made to FIG. 4, which illustrates an example call flow 400 between a chatbot module of the VSAE 103 and experts 102(1) to 102(N). The technical experts 102(1) to 102(N) are those who have been assigned a technical expertise score that is above a predetermined threshold for the corresponding category of vulnerabilities.

In various embodiments, all experts that are above a predetermined threshold (illustrated by way of example as experts 102(1) to 102(N)) or an expert having a highest expertise score for the relevant category may be communicated with by the chatbot module of the VSAE 103 to determine the missing CVSS parameters. The chatbot may make a list of questions 1 to N to ask the expert(s). For example, to better understand a confidentiality impact, the first question may be "Hi, do you know whether the wannafaint malware affects all the data on the drive or just a portion of it (i.e., step 401(1) to 401(N))? The VSAE 103 can then receive the response from the technical experts 102(1) to 102(N) and store it in a memory of the vulnerability server 116 or any other suitable repository (e.g., the cloud 120 of FIG. 1). In one embodiment, the content of each answer 403(1) to 403(N) is validated by mutual comparison. For example, the more common answer 403(1) 403(N) is deemed to be the correct answer. The more technical experts agree on the response (i.e., parameter), the higher the confidence level in the parameter. In one embodiment, each determined parameter is weighted based on the expertise score of the technical expert. The net score is then aggregated. The answer with the highest score is then deemed to be the correct answer for the parameter.

The questions/answers may continue until the VSAE 103 has gained sufficient parameters of the CVSS to be able to provide an early score of the identified vulnerability. In some scenarios, common slang terms and or misspellings are included in the questions to provide a more "human" experience to the technical experts during the chatbot conversation.

The chatbot module of the VSAE may use NLP and/or concept expansion, as discussed above, to discern the content of the raw natural language communication response from the technical expert. Further, the questions may be asked in different order for each expert based on the flow of the conversation. For example, based on the content of the response, the chatbot may ask a follow-up question for clarity or may drift with the direction of the conversation to make the interaction with the expert more enjoyable for the expert. Thus, while the list of questions is ultimately asked, the questions may be in a different order for each technical expert. Further, it is not required for every technical expert to answer for the VSAE 103 to develop a sufficient corpus of parameter information of the CVSS. By virtue of interacting with identified experts in the relevant category of a vulnerability, the CVSS score of the subject vulnerability can be determined earlier than an official release from the vulnerability database 112.

In one embodiment, in a resolution phase, the VSAE 103 is also configured to send notification(s) to appropriate recipients, in response to identifying a CVSS score of a vulnerability. The appropriate recipients may be individuals, organizations, or any other suitable entity that may be affected by the identified vulnerability, including the vulnerability database 112. The notification may be sent in various ways, such as common short code (CSC) using a short message service (SMS), multimedia message service (MMS), e-mail, telephone, social media, etc. In various embodiments, the notification can be provided on a user interface of a computing device (e.g., 102(1)) in the form of a message on the screen, an audible tone, a haptic signal, or any combination thereof. In some embodiments, the notification is not only an alert, but a patch (e.g., remedy) for the identified vulnerability.

While the social media server 110, vulnerability database 112, profile database 114, and vulnerability server 116 are illustrated by way of example to be on different platforms, it will be understood that in various embodiments, these platforms may be combined in various combinations. In other embodiments, one or more of these computing platforms may be implemented by virtual computing devices in the form of virtual machines or software containers that are hosted in the cloud 120, thereby providing an elastic architecture for processing and storage. The cloud 120 is discussed in more detail later.

Example Identification of Technical Experts Via Social Media Threads

As discussed above, the determination of the CVSS score of an identified vulnerability may include the identification of technical experts in the one or more categories of the vulnerability. In various embodiments, this identification may be performed during the training, interaction, or resolution phase. Different types of criteria and/or logic can be used to determine which users of social media can be deemed experts in one or more vulnerability categories. In one embodiment, each criterion may be attributed a different weight. For example, peer vote, number of views, number of comments, the quality of the comments (e.g., positive or negative), number of retweets, and expert profile 115 (i.e., prior ranking (expertise score) provided from the profile database 114—when available) may all affect the expertise score. Peer vote can be, for example, a rating by a peer as to whether the social media response from the user (i.e., potential technical expert) was helpful. For each tweet that is deemed to be related to a vulnerability, the number of replies, likes, retweets, and influence of the user can be used to determine an overall expertise score of the contributor (e.g., technical expert). The names and IDs of the contributors of the social media that are deemed by the VSAE 103 to have an overall technical expertise score that is above a predetermined threshold for their category are stored in the profile database 114 or any other suitable memory, such as that of the vulnerability server 116 or the cloud. A technical expert may have a different score for different categories.

In some embodiments, the activity of each technical expert is determined by the number of social media communications the technical expert has participated over a time period. The activity is then recorded (e.g., in the profile database 114) on an appropriate scale, such as "highly active," "active," or "occasionally active." In this way, the VSAE 103 can better gauge how long it may take for a technical expert to respond to an inquiry from a chatbot as well as prioritize the ones that may respond faster.

In one embodiment, noise-tolerant time-varying (NTT) algorithm may be used by the VSAE 103 to determine whether a contributor can be classified as a technical expert. The NTT algorithm provides a way of modeling the dynamic systems, such as the architecture 100. For example, the VSAE 103 can compute the likelihood of a contributor to be engaged in a vulnerability discussion via a social network based on various of parameters (e.g., context) such as, location, time, number of connections (e.g., social network connections), recent actions, recent postings, social network connections, profile, etc., of the contributor. As used herein, a recent action may include posting, adding a friend, liking a post, etc. that has been performed in a predetermined time bracket.

The NTT algorithm can be used by first defining an attribute matrix, wherein each row of the matrix corresponds to a contributor (e.g., potential technical expert) and each column corresponds to an attribute. For example, attributes may include recent contributions (e.g., to a vulnerability discussion thread), published blogs, use of (application programming interfaces) APIs, etc., by the corresponding contributor. An attribute augmented network can be defined based on, for example, the set of contributors, a set of links between contributors at any given time, and a set of APIs. For example, links are different types of properties how contributors can may be connected over the network. Action tracking is then achieved by learning a mapping function that maps the attribute augmented network to the action history of a contributor. For example, action tracking can be described as historical tracking of what a contributor did that may influence the actions of a second user (in the first contributor's network). A contributor's actions at any given time t can be influenced by other contributor's (that are within the contributor's social network) actions at time t. A contributor's actions may also be dependent on previous actions. Actions of multiple contributors can have a strong correlation. Consequently, the NTT algorithm identifies contributors that are technical experts in one or more categories, who would be likely to interact in future chats regarding vulnerabilities.

Example Processes

Figure 6:
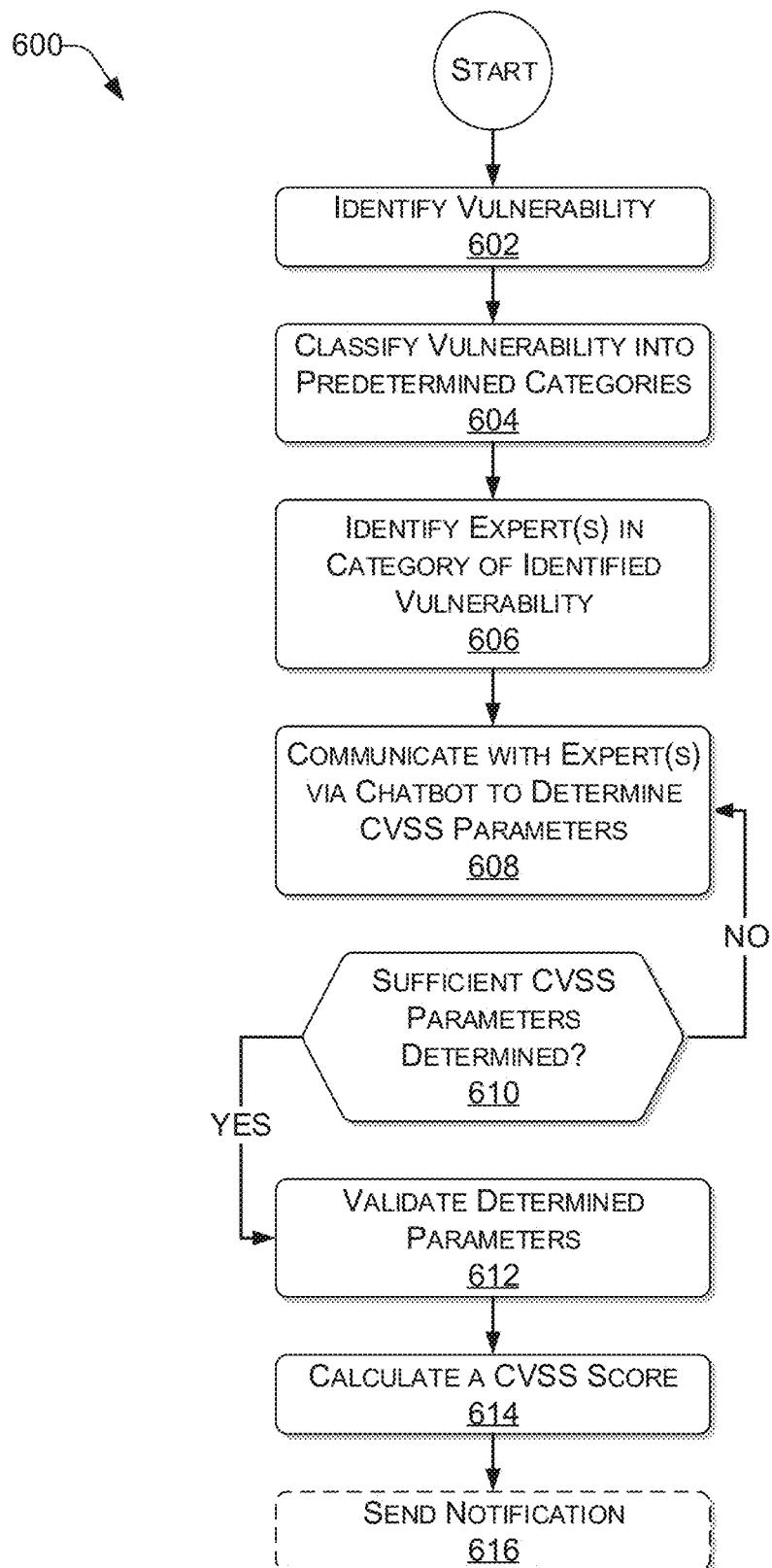
FIG. 6 presents an illustrative process for determining a Common Vulnerability Scoring System score for an identified vulnerability related to computing devices, via social media.
Figure 7:
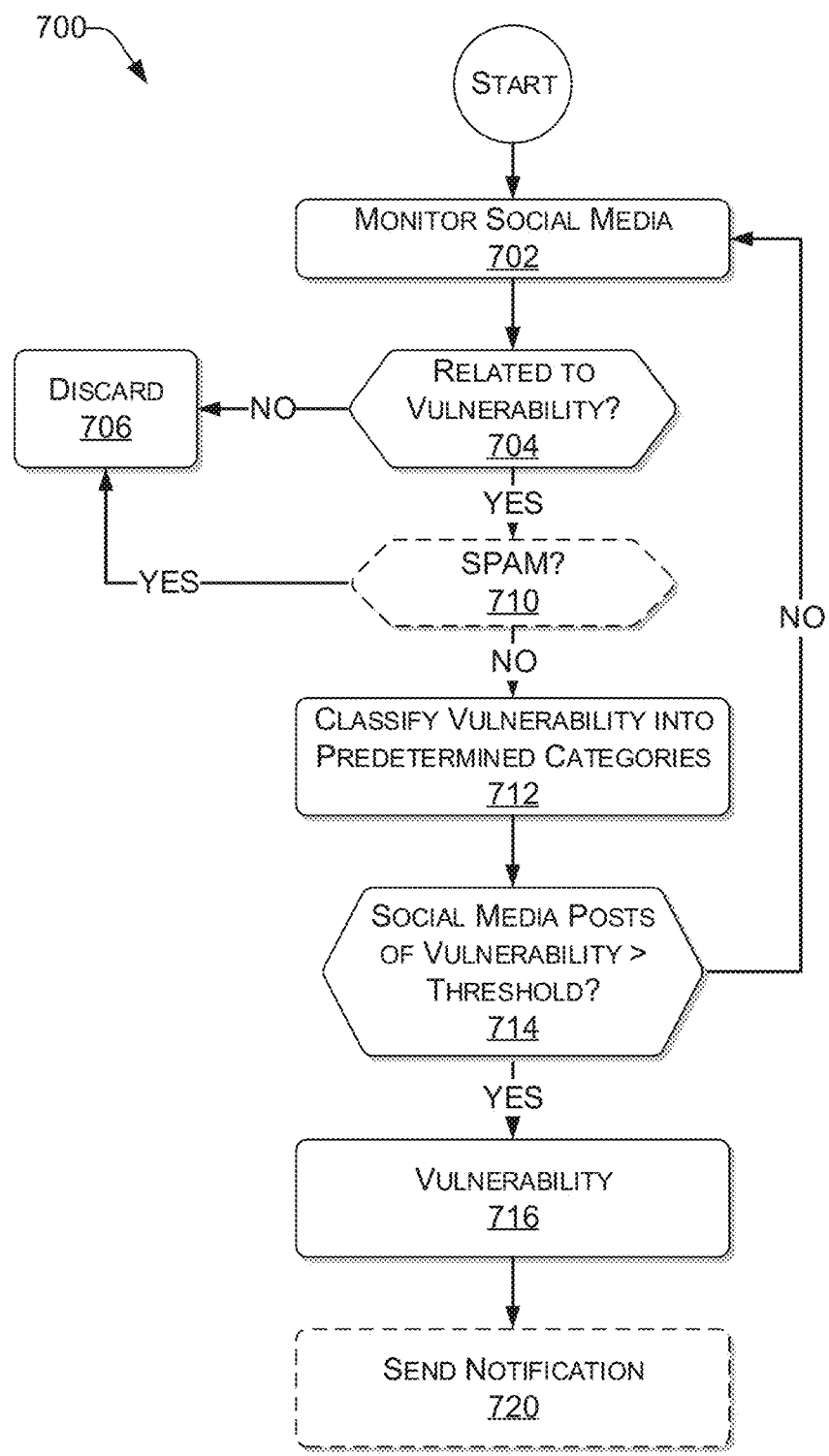
FIG. 7 presents an illustrative process for identifying a vulnerability via social media.

With the foregoing overview of the example architecture 100 and conceptual diagram of social media communication 200, and example call flow 400, it may be helpful now to consider a high-level discussion of an example processes. To that end, FIGS. 5 to 7 present illustrative processes related to various aspects of handling an identified vulnerability.

Processes 500 to 700 are illustrated as a collection of blocks in a logical flowchart, which represent sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the processes 500 to 700 are described with reference to the architecture 100 of FIG. 1.

Figure 5:
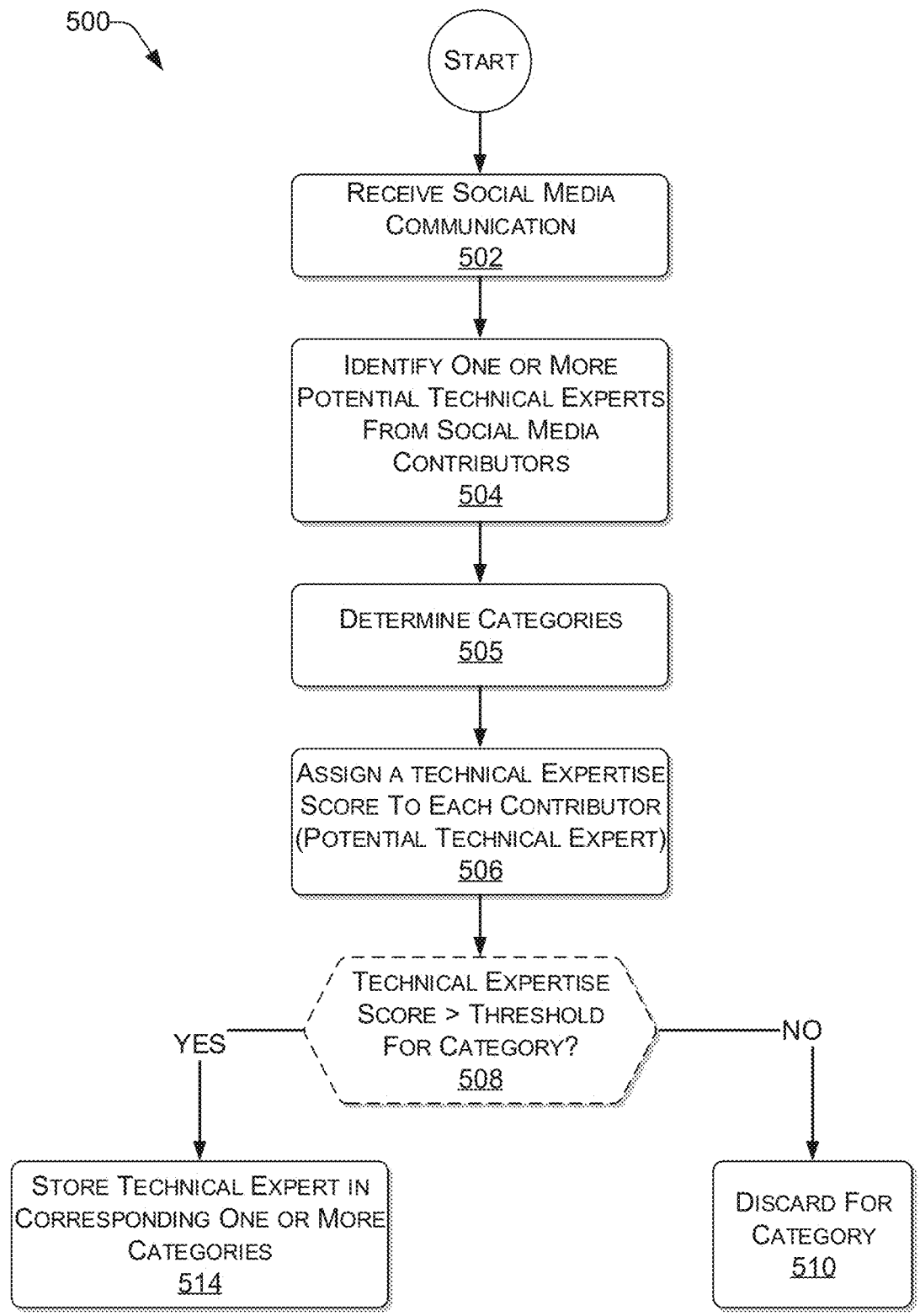
FIG. 5 presents an illustrative process for determining one or more technical experts for vulnerability categories.

FIG. 5 presents an illustrative process 500 for determining technical experts for vulnerability categories. In various embodiments, process 500 can be performed during a training, interaction, or resolution phase. At block 502, the VSAE 103 receives social media communication related to one or more categories of vulnerabilities of a computing devices from a social media repository 110. In various embodiments, the social media communication 111 can be received continuously, at predetermined intervals, or upon a trigger event (e.g., the vulnerability database issuing a new vulnerability where the CVSS score has not been yet calibrated).

At block 504, for each of the one or more predetermined categories of vulnerabilities, one or more technical experts are identified. More particularly, for each contributor of the social media communication (that is deemed by the VSAE 103 to be related to a vulnerability), expertise parameters are evaluated. The expertise parameters include at least one of: (i) a peer vote; (ii) a number of views; (iii) a number of comments; and (iv) a number of retweets parameter.

At block 505, for each contributor, one or more categories of expertise are determined.

At block 506, for each category of expertise of the contributor, an expertise score is assigned to the contributor, based on the expertise parameters. Accordingly, a contributor may be an expert in multiple categories. Further, a contributor may have a different expertise score for different categories.

In one embodiment, at block 508, the VSAE 103 determines, for each contributor, whether the technical expertise of the contributor is above a predetermined threshold for the category. In this regard, it is noted that different categories of vulnerabilities may have a different score threshold. Thus, even though a contributor may have a higher technical expertise score in category A than in category B, the threshold requirement for category A may be higher than that of category B.

Upon determining that the technical expertise score is above the threshold for the corresponding category (i.e., "YES" at decision block 508), the process continues with block 514, where the contributor is deemed to be a technical expert for the corresponding category and the profile information (e.g., user name, email, etc.,) of the technical expert is stored in a memory of the vulnerability server 116 and/or the profile database 114, together with the score and corresponding category. However, upon determining that the technical expertise score is not above the threshold for the corresponding category (i.e., "NO" at decision block 508), the process continues with block 510, where the profile of the contributor is not stored in a storage device (for the corresponding vulnerability category).

FIG. 6 presents an illustrative process 600 for determining a CVSS score for an identified vulnerability related to computing devices. Process 600 may be performed by the VSAE 103 during an interaction phase, which, in one embodiment, is after a training phase.

At block 602, a vulnerability related to a computing device may be identified. In various embodiments, the identification may be via an active monitoring of social media communication 111 via the social media repository 110 by the VSAE 103, or receipt of data 113 including the name of the vulnerability and one or more characteristics thereof from the vulnerability database 112.

At block 604, the VSAE 103 classifies the identified vulnerability into one or more vulnerability categories.

At block 606, one or more experts are identified for each of the one or more vulnerability categories of the identified vulnerability. In various embodiments, identifying experts may include (i) retrieving technical expert profiles 115 from the profile database 114, wherein the technical experts were previously identified during a training phase by way of process 500, and/or (ii) performing process 500 after identifying the vulnerability 602. In one embodiment, additional filtration may be performed by the VSAE 103 regarding the identified technical experts. In various examples, for each vulnerability category, the VSAE 103 may focus only on a technical expert that has a highest technical expertise score, the top N technical experts having the highest technical expertise scores, the technical experts that are most likely presently available, or any combination thereof.

At block 608, a chatbot module of the VSAE 103 communicates with one or more identified experts in each of the one or more categories, via a chatbot module of the VSAE 103, to determine parameters for a CVSS of the VSAE 103. For example, the VSAE 103 identifies unknown parameters that are salient in the determination of a CVSS score. The chatbot then queries the one or more technical experts to simulate a human conversational partner by using the natural language processing discussed herein. By virtue of using a chatbot, many (e.g., hundreds or thousands) of technical experts may be communicated with simultaneously to harvest the missing parameters via social media.

At block 610, the VSAE 103 determines whether sufficient CVSS parameters have been determined to develop a CVSS score. If not (i.e., "NO" at decision block 610), the process continues with block 608 and the communication continues the chatbot module and the technical experts. However, upon determining that sufficient CVSS parameters have been determined to develop a CVSS score (i.e., "YES" at decision block 610), the process continues with block 612.

At block 612, the VSAE 103 validates the determined CVSS parameters via mutual comparison of CVSS parameters ascertained by way of the chatbot module from different technical experts. For example, the more common answer is deemed to be the correct answer. Further, the more technical experts agree on the response, the higher the confidence level in the parameter.

At block 614, the VSAE 103 calculates a CVSS score based on the validated CVSS parameters. In various embodiments, the parameters may be based on at least one of the three metric groups, namely (i) Base, (ii) Temporal, and (iii) Environmental, each including a set of metrics. The more metric groups are used, the more accurate the CVSS may be.

In one embodiment, at block 616, the VSAE 103 sends notification(s) to appropriate recipients, in response to identifying an early CVSS score. The appropriate recipients may be individuals, organizations, or any other suitable entity that may be affected by the identified vulnerability, including the vulnerability database 112. The notification may be sent in various ways, such as common short code (CSC), using a short message service (SMS), multimedia message service (MIMS), e-mail, telephone, social media, etc. In various embodiments, the notification can be provided on a user interface of a computing device of a system administrator of a business enterprise, in the form of a message on the screen, an audible tone, a haptic signal, or any combination thereof. By virtue of identifying an early CVSS score, earlier remedial action can be taken to address the computing device vulnerability.

In one embodiment, upon the VSAE 103 validating the determined CVSS parameters via mutual comparison of CVSS parameters (i.e., after block 614), the VSAE 103 self-evaluates how it performed in its determination of the early CVSS score and the identification of the technical experts.

As discussed above, in one embodiment, the VSAE 103 is capable identifying a computing device vulnerability (i.e., instead of receiving the vulnerability information from the vulnerability database 112). To that end, reference is made to FIG. 7, which presents an illustrative process 700 for identifying a vulnerability via social media. Process 700 may be performed by the VSAE 103 during a separate monitoring phase, which, in one embodiment, is after a training phase.

At block 702, the VSAE 103 monitors social media communication 111. In this regard, the social media communication 111 may be received at predetermined intervals or upon a trigger event (e.g., upon the vulnerability database 112 indicating that there is a network security concern that is above a predetermined threshold).

At block 704, for each social media communication 111 received, the VSAE 103 determines whether the communication therein (e.g., social media thread(s)) is related to a potential vulnerability of a computing device). If not (i.e., "NO" at decision block 704), the process continues with block 706, where the social media communication (e.g., a post or a thread) is discarded. However, upon determining that the social media communication is related to a potential vulnerability (i.e., "YES" at decision block 704), in various embodiments, the process continues with block 710 or 712.

In one embodiment, at block 710, the social media communication is filtered by discarding social media communication that is deemed to be SPAM by the VSAE 103 (i.e., "YES" at decision block 710). Upon filtering, the process continues with block 712, where the vulnerability engine classifies each identified potential vulnerability into a corresponding predetermined category.

At block 714, the VSAE 103 determines, for each identified vulnerability, whether the number of social media posts related to the potential vulnerability exceeds a predetermined threshold. In various embodiments, the threshold may be based on the longevity (e.g., time) of the social media communication, volume of the social media communication (e.g., number of posts in a thread and/or a number of threads identifying a substantially similar vulnerability), or a combination thereof. The predetermined threshold may be different for each predetermined category. In this way, more serious threat categories can have a lower trigger point than less consequential threat categories.

Upon determining that the number of social media posts related to the vulnerability is not above the predetermined threshold (e.g., for its category) (i.e., "NO" at decision block 714), the process continues with block 702, thereby continuing to monitor the social media. However, upon determining that the number of social media posts related to the vulnerability is above the predetermined threshold (i.e., "YES" at decision block 714), the process continues with block 716, where the VSAE 103 identifies the potential vulnerability as an actual vulnerability.

At block 720, in one embodiment, the VSAE 103 sends notification(s) to appropriate recipients, in response to identifying a vulnerability. The appropriate recipients may be substantially similar to those discussed in the context of process 600.

Example Computer Platform

Figure 8:
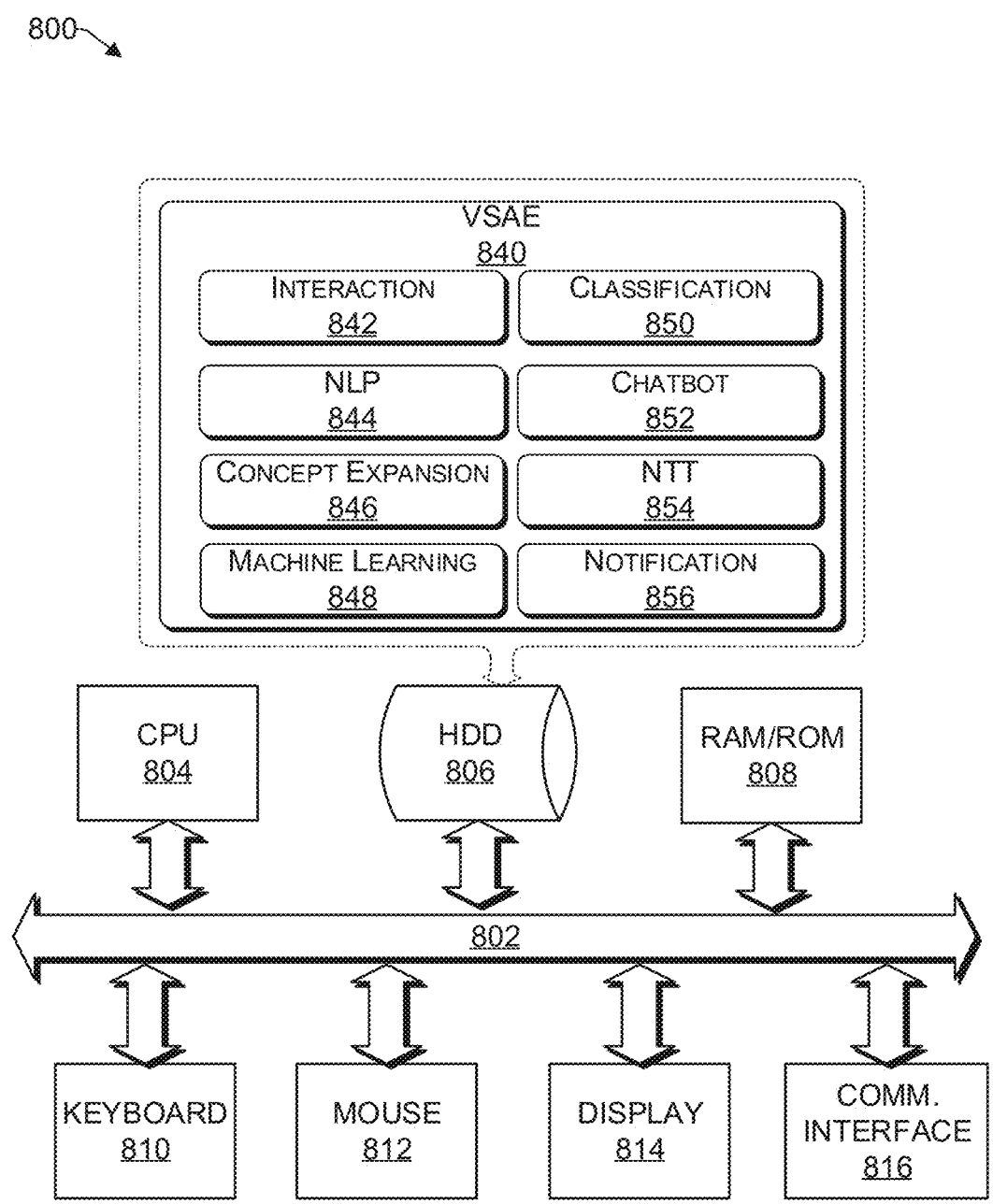
FIG. 8 is a functional block diagram illustration of a computer hardware platform that can communicate with various networked components, consistent with an illustrative embodiment.

As discussed above, functions relating to determining a severity of an identified vulnerability related to computing devices via social media, can be performed with the use of one or more computing devices connected for data communication via wireless or wired communication, as shown in FIG. 1 and in accordance with the processes 500 to 700 of FIGS. 5 to 7, respectively. FIG. 8 provides a functional block diagram illustration of a computer hardware platform that is capable of facilitating the interaction of social media communication, identification of vulnerabilities of computing devices based on the monitored social media communication, identification of technical experts for different vulnerability categories, identification of an early CVSS score of the identified vulnerability, and the sending of notifications, as discussed herein. In particular, FIG. 8 illustrates a network or host computer platform 800, as may be used to implement a server, such as the vulnerability server 116 of FIG. 1.

The computer platform 800 may include a central processing unit (CPU) 804, a hard disk drive (HDD) 806, random access memory (RAM) and/or read only memory (ROM) 808, a keyboard 810, a mouse 812, a display 814, and a communication interface 816, which are connected to a system bus 802.

In one embodiment, the HDD 806, has capabilities that include storing a program that can execute various processes, such as the vulnerability engine 840, in a manner described herein. The vulnerability engine 840 may have various modules configured to perform different functions.

For example, there may be an interaction module 842 that is operative to receive electronic data from various sources, including social media communication 111, expert profile information 115 from the profile database 114, security information from the vulnerability database 112, and data provided by the cloud 120.

In one embodiment, there is a natural language processing (NLP) module 844 operative to process the raw natural language content of each communication in the social media communication 111 from various users, who may be technical experts in their respective vulnerability categories. There may be a concept expansion module 848, operative to identify the concept cues in each social media communication to determine the intent thereof. There may be a machine learning module 848 operative to learn from the security information 113 received from the vulnerability database 112 during a training phase. The machine learning module 848 may also aid in identifying SPAM such that it can be removed from social media threads being evaluated, as well as identifying technical experts for different vulnerability categories. In one embodiment, there is a classification module 850 operative to place each identified vulnerability into a corresponding predetermined threat category.

There is a chatbot module 854 operative to interact with one or more identified technical experts via social media in order to identify missing parameters of the CVSS. There may be noise-tolerant time-varying (NTT) algorithm module that may be used by the VSAE 840 to determine whether a social media contributor can be classified as a technical expert. There may be a notification module 856 operative to send alerts (e.g., notification(s)) to appropriate recipients, in response to identifying an early CVSS score.

In one embodiment, a program, such as Apache™, can be stored for operating the system as a Web server. In one embodiment, the HDD 806 can store an executing application that includes one or more library software modules, such as those for the Java™ Runtime Environment program for realizing a JVM (Java™ virtual machine).

Example Cloud Platform

As discussed above, functions relating to determining a severity of an identified vulnerability related to computing devices, via social media, may include a cloud 200 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
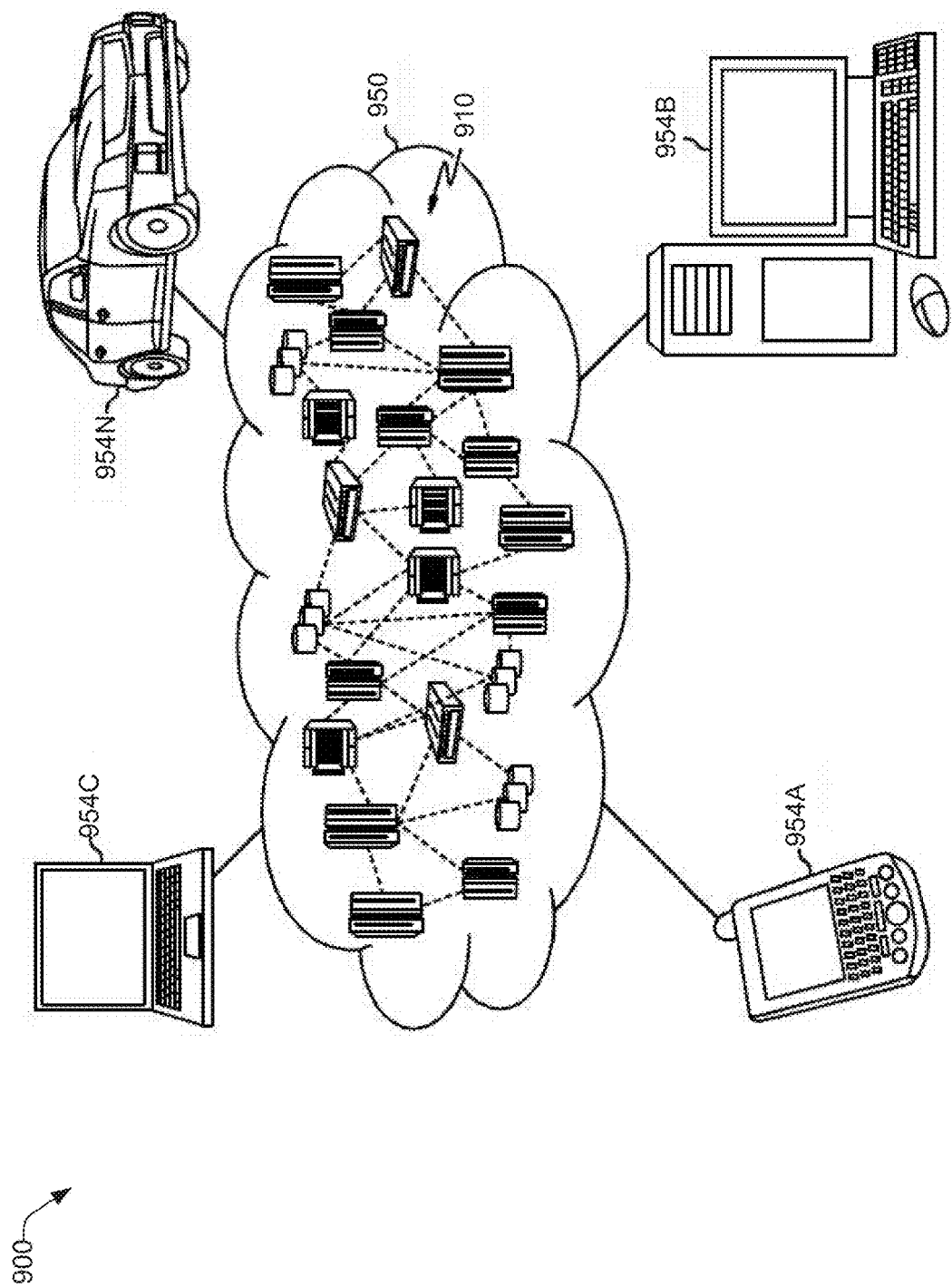
FIG. 9 depicts a cloud computing environment, consistent with an illustrative embodiment.

Referring now to FIG. 9, an illustrative cloud computing environment 900 is depicted. As shown, cloud computing environment 900 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
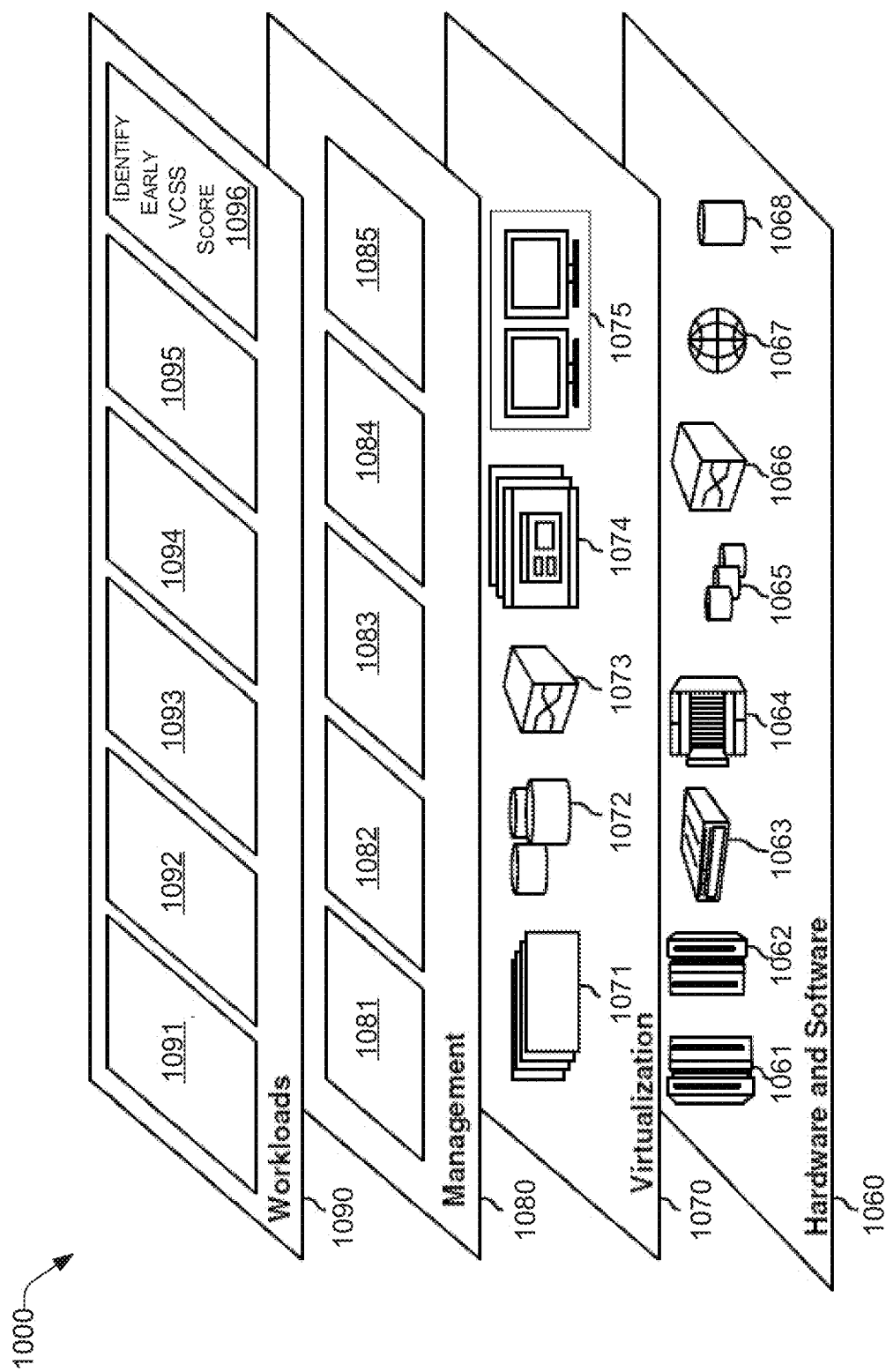
FIG. 10 depicts abstraction model layers, consistent with an illustrative embodiment.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the disclosure are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and identifying an early CVSS score for an identified vulnerability related to computing devices via social media 1096, as discussed herein.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
   a processor;
   a network interface coupled to the processor to enable communication over a network;
   a storage device coupled to the processor;
   a vulnerability engine code stored in the storage device, wherein an execution of the code by the processor configures the computing device to perform acts comprising:
   identifying a vulnerability related to a computing device;
   identifying one or more technical experts for each of one or more categories of vulnerabilities of the identified vulnerability;
   iteratively sending questions to and receiving answers from one or more identified technical experts in each of the one or more categories of vulnerabilities, via a chatbot module of the computing device;
   determining answers to parameters that are missing for a common vulnerability scoring system (CVSS) for the identified vulnerability, from the received answers from the one or more identified technical experts;
   validating the determined answers to the parameters; and
   creating a CVSS score based on the validated determined answers.

2. The computing device of claim 1, wherein identifying a vulnerability related to a computing device comprises:
   monitoring social media communication;
   identifying social media threads that are related to a potential vulnerability of a computing device, based on the monitored social media communication;
   filtering the identified social media threads by removing SPAM postings therefrom;
   classifying the filtered identified social media threads into one or more categories of vulnerabilities; and
   upon determining that a number of social media posts of the social media threads that are related to the potential vulnerability is above a predetermined threshold, classifying the potential vulnerability as a vulnerability.

3. The computing device of claim 1, wherein identifying a vulnerability related to a computing device comprises:
   receiving a data packet from a database, the data packet including a name of the vulnerability without a corresponding calibrated CVSS score.

4. The computing device of claim 1, wherein identifying one or more technical experts for the one or more predetermined categories of vulnerabilities comprises:
   receiving social media communication from a social media repository;
   for each contributor of the social media communication that is related to a vulnerability:
      evaluating one or more expertise parameters comprising at least one of: (i) a peer vote; (ii) a number of views; (iii) a number of comments; and (iv) a number of retweets;
      determining one or more categories of vulnerabilities of expertise of the contributor;
      for each category of vulnerability of expertise of the contributor:
         assigning an expertise score to the contributor based on the expertise parameters;
         upon determining that the contributor has an expertise score that is above a predetermined threshold for the category of vulnerability:
            classifying the contributor as a technical expert for the category of vulnerability; and
            storing a profile of the technical expert, including the expertise score for the category of vulnerability, in a profile database.

5. The computing device of claim 4, wherein the social media communication is received from the social media repository at predetermined intervals via the network interface.

6. The computing device of claim 4, wherein the predetermined threshold is different for each category of vulnerability.

7. The computing device of claim 1, wherein validating the determined answers to the parameters comprises, for each parameter:
 weighting each answer for the parameter for each technical expert based on an expertise score of the technical expert;
 aggregating a net score based on the weighted answers from all technical experts for the parameter; and
 identifying the answer having a highest net score as the validated answer for the parameter.

8. The computing device of claim 1, wherein iteratively sending questions to and receiving answers from the one or more identified technical experts in each of the one or more categories of vulnerabilities, comprises:
 identifying a list of CVSS parameters that are missing;
 interactively asking the one or more identified technical experts questions based on the missing CVSS parameters;
 for each of the one or more identified technical experts:
  using natural learning processing (NLP) to process a raw natural language content of each answer;
  extracting the missing CVSS parameters from each processed answer; and
 storing each answer for the parameter in the storage device.

9. The computing device of claim 1, wherein the identification of technical experts is performed during a training phase that is before the identification of the vulnerability.

10. The computing device of claim 1, wherein iteratively sending questions to and receiving answers from the one or more identified technical experts in each of the one or more categories of vulnerabilities, via a chatbot module of the computing device comprises, for each technical expert:
 extracting meaningful one or more sentences from each response of the technical expert via natural learning processing (NLP); and
 determining an intent of each response via concept expansion.

11. The computing device of claim 1, wherein the one or more categories of vulnerabilities include at least one of:
 Denial of Service (DOS);
 SQL Injection;
 code execution; and
 memory corruption.

12. The computing device of claim 1, further comprising, upon determining the CVSS score of the vulnerability, sending a notification to one or more computing devices that are deemed to be affected or are at risk to be affected by the identified vulnerability.

13. A non-transitory computer readable storage medium tangibly embodying a computer readable program code having computer readable instructions that, when executed, causes a computer device to carry out a method of determining a common vulnerability scoring system (CVSS) score for an identified vulnerability related to a computing device, the method comprising:
 identifying one or more technical experts for each of one or more categories of vulnerabilities of the identified vulnerability;
 iteratively sending questions to and receiving answers from one or more identified technical experts in each of the one or more categories of vulnerabilities, via a chatbot module;
 determining answers to parameters that are missing for the CVSS for the identified vulnerability, from the received answers from the one or more identified technical experts;
 validating the determined answers to the parameters; and
 calculating the CVSS score based on the validated determined answers.

14. The non-transitory computer readable storage medium of claim 13, wherein the vulnerability related to a computing device is identified by:
 monitoring social media communication;
 identifying social media threads that are related to a potential vulnerability of a computing device, based on the monitored social media communication;
 filtering the identified social media threads by removing SPAM postings therefrom;
 classifying the filtered identified social media threads into one or more categories of vulnerabilities; and
 upon determining that a number of social media posts of the social media threads that are related to the potential vulnerability is above a predetermined threshold, classifying the potential vulnerability as a vulnerability.

15. The non-transitory computer readable storage medium of claim 13, wherein identifying one or more technical experts for the one or more predetermined categories of vulnerabilities comprises:
 receiving social media communication from a social media repository;
 for each contributor of the social media communication that is related to a vulnerability:
  evaluating one or more expertise parameters comprising at least one of: (i) a peer vote; (ii) a number of views; (iii) a number of comments; and (iv) a number of retweets;
  determining one or more categories of vulnerabilities of expertise of the contributor;
  for each category of vulnerability of expertise of the contributor:
   assigning an expertise score to the contributor based on the expertise parameters;
   upon determining that the contributor has an expertise score that is above a predetermined threshold for the category of vulnerability:
    classifying the contributor as a technical expert for the category of vulnerability; and
    storing a profile of the technical expert, including the expertise score for the category of vulnerability, in a profile database.

16. The non-transitory computer readable storage medium of claim 15, wherein the predetermined threshold is different for each category of vulnerability.

17. The non-transitory computer readable storage medium of claim 13, wherein validating the determined answers to the parameters comprises, for each parameter:
 weighting each answer for the parameter for each technical expert based on an expertise score of the technical expert;
 aggregating a net score based on the weighted answers from all technical experts for the parameter; and
 identifying the answer having a highest net score as the validated answer for the parameter.

18. The non-transitory computer readable storage medium of claim 13, wherein iteratively sending questions to and receiving answers from the one or more identified technical experts in each of the one or more categories of vulnerabilities, comprises:
 identifying a list of CVSS parameters that are missing;

interactively asking the one or more identified technical experts questions based on the missing CVSS parameters;

for each of the one or more identified technical experts:
  using natural learning processing (NLP) to process a raw natural language content of each answer;
  extracting the missing CVSS parameters from each processed answer; and storing each answer for the parameter in the storage device.

19. The non-transitory computer readable storage medium of claim 13, wherein the one or more categories of vulnerabilities include at least one of:

Denial of Service (DOS);
SQL Injection;
code execution; and
memory corruption.

20. The non-transitory computer readable storage medium of claim 13, further comprising, upon determining the CVSS score of the vulnerability, sending a notification to one or more computing devices that are deemed to be affected or are at risk to be affected by the identified vulnerability.

\* \* \* \* \*